(12) United States Patent
Mejia

(10) Patent No.: US 6,369,694 B1
(45) Date of Patent: *Apr. 9, 2002

(54) APPARATUS AND METHOD FOR REMOTELY TESTING A PASSIVE INTEGRATED TRANSPONDER TAG INTERROGATION SYSTEM

(75) Inventor: Ezequiel Mejia, Woodbury, MN (US)

(73) Assignee: Digital Angel Corporation, South St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/619,853

(22) Filed: Jul. 20, 2000

Related U.S. Application Data

(63) Continuation of application No. 08/918,482, filed on Aug. 26, 1997, now Pat. No. 6,184,777.
(51) Int. Cl.[7] .................................. H04Q 5/22
(52) U.S. Cl. ................. 340/10.1; 340/5.8; 340/571; 340/572.1; 341/176; 342/51
(58) Field of Search .................. 340/10.1, 5.8, 340/571, 572.1; 341/176; 342/51

(56) References Cited

U.S. PATENT DOCUMENTS

| 4,646,082 A | 2/1987 | Engel et al. |
| 4,663,625 A | 5/1987 | Yewen |
| 5,235,326 A | 8/1993 | Beigel et al. |
| 5,523,750 A | 6/1996 | De Vall |

Primary Examiner—Michael Horabik
Assistant Examiner—Yves DaLencourt
(74) Attorney, Agent, or Firm—Stroock & Stroock & Lavan LLP

(57) ABSTRACT

A remotely testable Passive Integrated Transponder (PIT) tag interrogation system is described. The system comprises a remotely activated test PIT tag fixed within the field of the system antenna By selectively activating the test PIT tag, and determining successful receipt of the test tag identification signal during such activation, remote confirmation of proper operation of the system is achieved. The system also contains components which permit the remote detection of the antenna field by analyzing signals present in the antenna during operation. Remote detection of the natural frequency to which the antenna is tuned is also achieved by analyzing signals present in the antenna during the collapse of the electromagnetic field in the antenna when the antenna drive signal is removed.

16 Claims, 5 Drawing Sheets

APPARATUS AND METHOD FOR REMOTELY TESTING A PASSIVE INTEGRATED TRANSPONDER TAG INTERROGATION SYSTEM

This application is a continuation of application Ser. No. 08/918,482, filed Aug. 26, 1997, which is now U.S. Pat. No. 6,184,777 the contents of which are hereby incorporated by reference.

FIELD OF THE INVENTION

This invention relates to the field of passive integrated transponder tag interrogation systems, and specifically to an apparatus and method for remotely testing such systems.

BACKGROUND OF THE INVENTION

The use of Passive Integrated Transponder (PIT) tags which may be embedded in or attached to items to be tracked and accounted for has been widespread for some time. These commonly known PIT tag systems generally comprise one or, more antenna coils so positioned as to generate a field of radiated electromagnetic energy within which the tagged item or object must pass. As generally deployed, such systems are used to track and/or count animals within which a PIT tag has been subcutaneously embedded or externally affixed. As the PIT tag traverses the radiated field of electromagnetic energy, it is energized in a manner known in the art. The PIT tag uses this energy—which is typically stored in a capacitive element—to power a transmission circuit which emits a unique PIT tag identification signal that is detected by the aforementioned antenna element. The identification signal detected by the antenna element is then transmitted to remote processing equipment which decodes the detected signal and uses this decoded information for the purposes of counting, tracking or otherwise maintaining records pertinent to.,the population of items or animals being tracked by said system.

These commonly known and used PIT tag interrogation systems suffer from a drawback heretofore unremedied in the art, that being the ability to remotely insure proper operation of the interrogation system. This shortcoming is particularly troublesome in applications where the antenna system is located in a remote location from the control point, or in locations which are physically difficult to access, such as, for example, underwater tunnels through which PIT-tagged fish travel for identification and tracking. The present solution for testing such systems is to have a user travel to the antenna location and physically pass a PIT tag through the antenna's radiated energy field so as to generate a tag signal detectable by the control unit. Successful receipt of the manually passed tag signal confirms that the system is operating properly. This present method of testing is expensive, resource intensive, and time consuming. Further, the difficulty in performing such an operation in fish tunnels placed underwater is obvious.

It would therefore be greatly advantageous for an apparatus or method to be developed which would alleviate the above identified shortcomings of the prior art. The present invention provides a solution.

SUMMARY OF THE INVENTION

The remotely testable PIT tag interrogation system of the present invention generally comprises a receiver/transmitter antenna, an antenna interface unit, a control unit, and a general purpose digital computer, along with associated control cabling, input keyboards, and visual displays. As used herein the terms Passive Integrated Transponder tags and/or PIT tags are used synonymously and are intended to mean any type of passive transponder which emits a signal in response to exposure to a radiated electromagnetic, electrical or magnetic energy field, such as, for example, 134 kilohertz (kHz) Transponder tags conforming to the ISO/DIS 11785 standard, or their art recognized equivalent. Such tags are commonly subcutaneously embedded in animals for the purpose of tracking and identifying them in such locations as zoos and farms, or in the wild. Such tags are also used for tagging fish and birds, as well as domestic pets. As is known in the art, and as will become evident from a further reading of the material below, systems such as the one described herein, may be deployed in numerous applications and situations limited only by the imagination of the person of skill in the art. The system of the present invention may therefore be used in any application wherein transponders are placed on objects for tracking such objects as they pass within or through the field of a bi-directional antenna which energizes the transponder and receives identifying signals therefrom. As used herein, the terms object and item are used interchangeably and mean any PIT tagged entity, animate or inanimate.

The present invention utilizes a bi-directional antenna which is deployed in a location such that animals or objects equipped with PIT tags will pass through the energy field radiated by the antenna. When passing within the energizing field, the PIT tag is energized by the electromagnetic energy radiated by the antenna. This energization is achieved by charging a storage device in the PIT tag, typically a capacitive element, which then becomes a power source the PIT tag. The PIT tag utilizes this stored energy to generate a unique tag identification signal which is received by the antenna The antenna is connected via antenna leads, in a manner commonly known in the art, to an antenna interface unit which demodulates the tag identification signal and converts it into a data signal which is passed to a control unit which logs and tracks the identification signals received. The control unit generally comprises a display and keyboard through which a user may operate the system and view information about the tags being interrogated by the system.

The control unit is typically further connected to a general purpose digital computer which can be used to remotely control the system as well as to collect and process data related to the tags interrogated and identified by the system. Additionally, the control unit, the computer, or both may be used to activate programmable logic control (PLC) devices for triggering other events, such as, for example, gate closures, alarm indications, etc.

Generally, PIT tag systems are designed to operate automatically, with little to no operator intervention. Without direct visual observation, it is therefore impossible to determine if the absence of a tag interrogation and identification cycle is due to an absence of animals or objects passing within the antenna's radiated energy field or due to a system malfunction which is preventing tag interrogation signals from reaching the control unit. To overcome this problem, a remotely controllable PIT tag is mounted at the antenna site within the radiant energy field of the antenna. This remote test PIT tag, under the control of the system control unit and/or the attached general purpose computer, can be selectively operated so that at predetermined times the system may activate the test tag and thereby insure that the system is operating normally.

The remotely deployed test tag contains a unique identification code which when received by the system is recognized as the test tag identification code. This test tag is typically remotely activated by a relay, powered from the control unit, but deployed within the remote test tag for selectively activating and deactivating the test tag electronics. Further, varying the position of the test tag within the radiated energy field of the antenna provides an indication of the field strength of the antenna, since, if the remote test tag is fixably located at the fringes of the radiated energy field, and a remote test tag identification signal is successfully received by the control unit, this would indicate that the antenna is operating at peak performance.

In addition to the remotely controllable test tag, the system may be supplied with an additional remote test feature which, in the event of a test tag failure, will further isolate the source of the difficulty within the system. Specifically, the antenna interface unit is equipped with circuitry which permits the remote detection of the field produced by the antenna. Such a capability permits the detection of an open antenna coil or a circuitry failure in the antenna drive unit.

When operating properly, the antenna interface unit receives a signal from a PIT tag in the antenna field and digitizes it for further transmission to the control unit. The antenna may be located at a variety of distances from the antenna interface unit through antenna cabling commonly known in the art. Further, the antenna interface unit may be either remotely located or co-located with the control unit. The control unit may similarly be located near to, or remote from the general purpose computer, as application requirements dictate. Data transmission within the system may be accomplished over twisted pair cable, fiber optic cable or a combination thereof as a matter of design choice. Of course, the person of skill will recognize that the various data communication methodologies that are employed in the system may be varied to fit the application requirements to which the system is addressed, and these methodologies may be wired or wireless, metallic or optical, or any art recognized combination thereof, as a matter of design choice.

Other objects and features of the present invention will become apparent from the following detailed description considering conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views:

FIG. 1. is a schematic diagram of a remotely testable PIT tag interrogation system in accordance with the present invention;

DETAILED DESCRIPTION OF THE PREFERRED EMBODIMENTS

Figure 1:
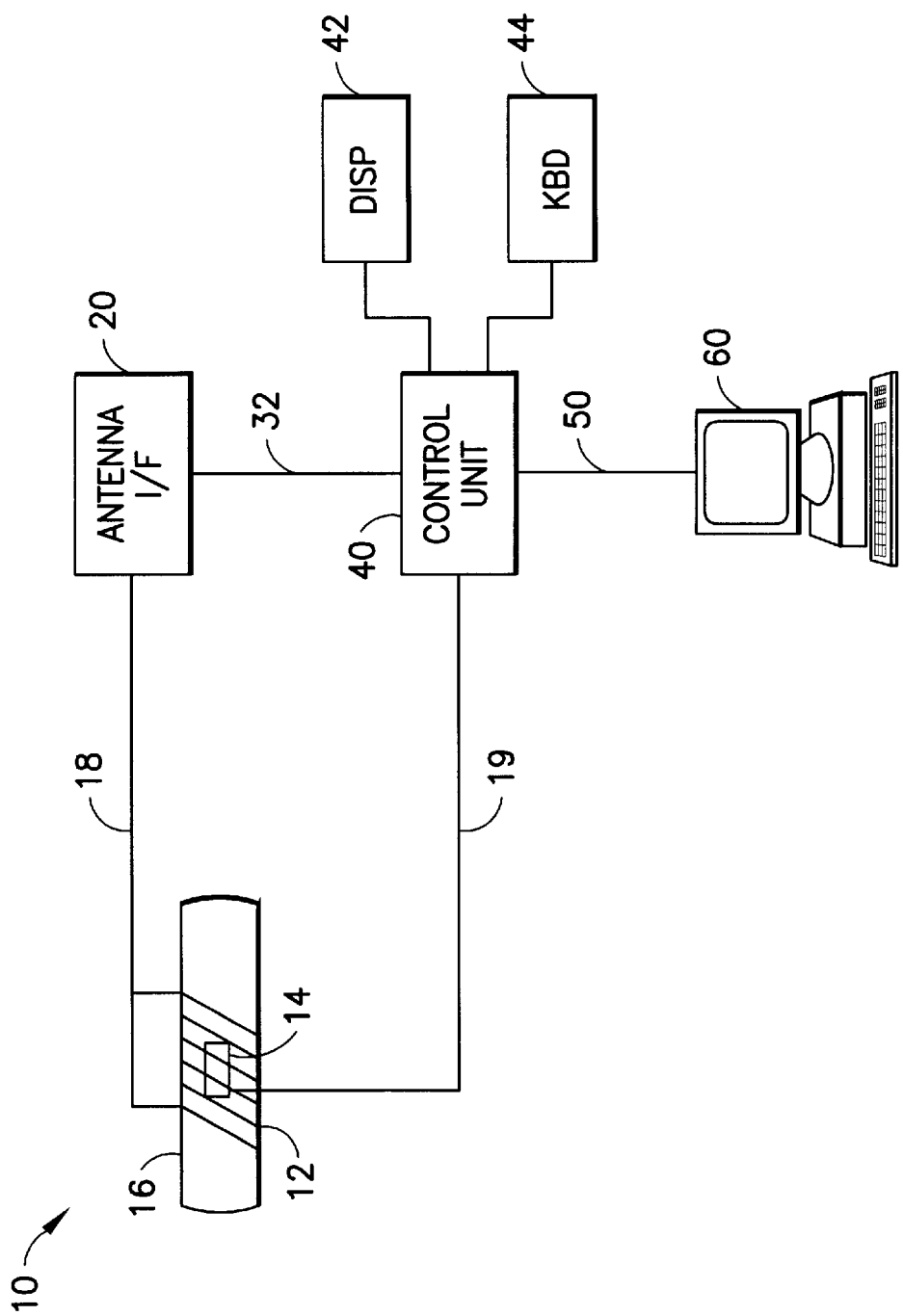

With initial reference to FIG. 1, there is depicted a schematic diagram of a passive integrated transponder tag interrogation system 10 in accordance with the present invention. An antenna 12 is connected via an antenna interface unit 20 to a control unit 40. Control unit 40 is generally connected to a general purpose digital computer 60, such as an IBM compatible personal computer, a mini computer or other device capable of running software programs having functionality of the type further discussed herein. Control unit 40, however, controls the major functions of the system 10 and maybe operated via a directly connected keyboard 44 and display 42, providing direct operator control without the need for computer 60.

Antenna 12 is deployed proximate a tunnel or passage 16 through which the tagged items to be tracked must pass. Antenna 12 is powered by antenna interface 20 under the control of control unit 40 and generates an electromagnetic energy field within passage 16. In a manner known in the art, as an item carrying a PIT tag passes through the energy field generated by antenna 12 (not shown), the PIT tag is energized by the electromagnetic field and in turn emits an identifying signal which is detected by antenna 12 and sent through antenna interface 20 to control unit 40 in a manner discussed further below. While the tunnel or passage 16 is depicted as a generally tubular passage in FIG. 1, it will be recognized that the particular shape and configuration of the passage, channel, tunnel or other structure which leads a PIT tagged item to traverse the electromagnetic field generated by antenna 12 is purely a matter of design choice for the person of skill in the art, it being recognized that the passage 16 may vary in countless ways depending on the application to which the system is applied. Thus, as long as passage 16 is developed in such a manner as to cause the item carrying a PIT tag to pass within the electromagnetic field of antenna 12 in such a manner as to be energized by said electromagnetic field and to emit a signal responsive thereto, the requirements of the inventive system have been met. Similarly, while antenna 12 is depicted as an antenna coil surrounding passage 16, it will further be recognized by the person of skill in the art that antenna 12 may be configured and deployed in numerous ways such as, by way of none limiting example, flat panel antennas, arrays, antenna rods, dishes, etc. As discussed above in connection with passage 16, antenna 12 need only be configured and deployed in such a manner as to generate an electromagnetic field of sufficient strength and dimension to energize a PIT tag in a desired location and to detect the signal generated by that PIT tag in response to energization by the antenna. In a preferred embodiment, the antenna is designed for the purpose of reading 134 Kilohertz (kHz) PIT tags conforming to the ISO/DIS 11785 standard. It will of course be recognized by the person of skill that the antenna and PIT tags may be designed to operate at other frequencies and energy levels than that of the preferred ISO standard, as a matter of engineering design choice.

Referring once again to FIG. 1, a remote test tag 14 is mounted proximate said antenna 12 on said passage 16. Remote test tag 14 may be deployed within passage 16, or placed external to passage 16 as a matter of design choice, provided that the test tag is fixedly mounted within the energizing field generated by antenna 12 for being energized by antenna 12 and for emitting an identifying signal to antenna 12 for processing by antenna interface unit 20 and subsequently by control unit 40. In a preferred embodiment, remote test tag 14 is mounted outside passage 16 so as to avoid interference with any items passing through channel 16 and also for the added benefit of providing an indication of the field strength of antenna 12. Specifically, remote test tag 14 is positioned at the fringes of the radiated energy field, thus removing it from the location of maximum field strength of antenna 12. When so positioned, if remote test tag 14 can successfully be energized by antenna 12, and antenna 12 can successfully detect a signal generated by remote test tag 14, this would generally indicate that the antenna is generating an adequate electromagnetic field within channel 16, where the field strength is at its maximum, and also is sensitive enough to detect PIT tags within channel 16. Thus, placement of the test tag may vary depending on the field strength of the antenna Antenna 12 is connected to antenna interface unit 20 via an antenna cable 18. Antenna cable 18 may be any type of antenna cable known in the art, such as, for example, coaxial cable, twin lead, of other conductor. In a preferred embodiment, antenna 12 comprises a coil of 16 gauge (AWG) copper wire having 16 gauge wire leads directly connected to antenna interface 20. Such a coil is particularly advantageously deployed in applications where the antenna surrounds a passage 16 having a round, ovoid, rectangular or square cross section, such as those commonly used to direct the passage of tagged fish through the electromagnetic field of antenna 12. The specific technique of connecting antenna 12 to antenna interface 20 through antenna cable 18 is purely a matter of design choice well within the skill of the routineer in the art of such antennas.

Figure 4:
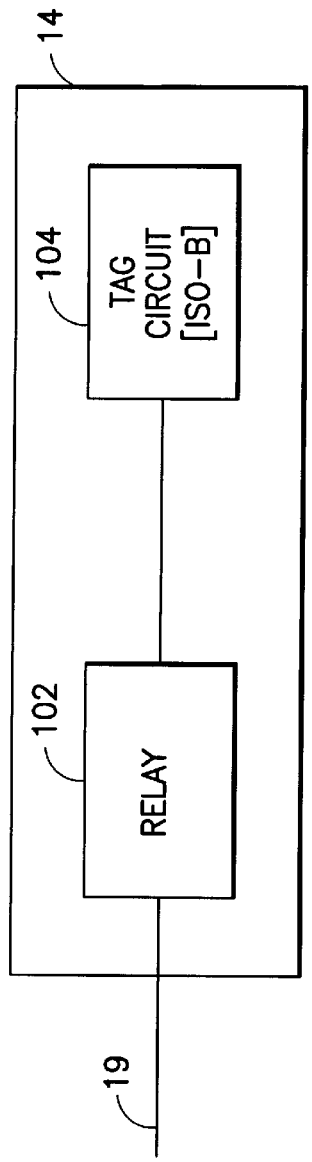
FIG. 4 is a schematic diagram of the remotely controlled test tag of the present invention.

Referring now to FIGS. 1 and 4, remote test tag 14 is shown connected through a remote test tag cable 19 to, control unit 40. Remote test tag 14 is, in a presently preferred embodiment, a standard ISO type B tag comprising standard ISO type B tag circuitry 104. Test tag 14 is, however, modified to include a remotely controllable relay 102 which may be selectively activated and deactivated by control unit 40 through a remote test tag cable 19. In use, control unit 40, either at specifically programmed intervals or under direct user instruction, activates relay 102 in such a manner as to activate tag circuitry 104 on demand. When tag circuit 104 is so activated, electromagnetic field produced by antenna 12 will energize test tag 14 in a manner known in the art. Test tag 14 will, correspondingly, in a manner also known in the art, emit its test tag identification signal. Thus, when control unit 40 remotely activates remote test tag 14 and in turn receives through antenna 12 and antenna interface unit 20 the test tag identification signal emitted by test tag 14, the integrity of the system has been confirmed and control unit 40 will signal to an operator that the system has successfully been tested. Operator indication may be accomplished through an indication on display 42, or through a signal sent through data communications cable 50 to computer 60. It will of course be recognized by the person of skill in the art that the manner of controlling test tag 14 via control unit 40 may be accomplished in numerous ways other than through a direct wire and relay arrangement, as long as control unit 40 has the ability to selectively activate and deactivate tag circuitry 104 at predetermined times selected by the operator of the system 10. For an ISO type B tag, the relay is operated for 50 to 60 milliseconds, which permits ample time for the tag to emit its identification signal while allowing for the reaction time of the relay. Different relays and tags, and different operating frequencies, will of course necessitate different activation times, as a matter of design choice.

Figure 2:
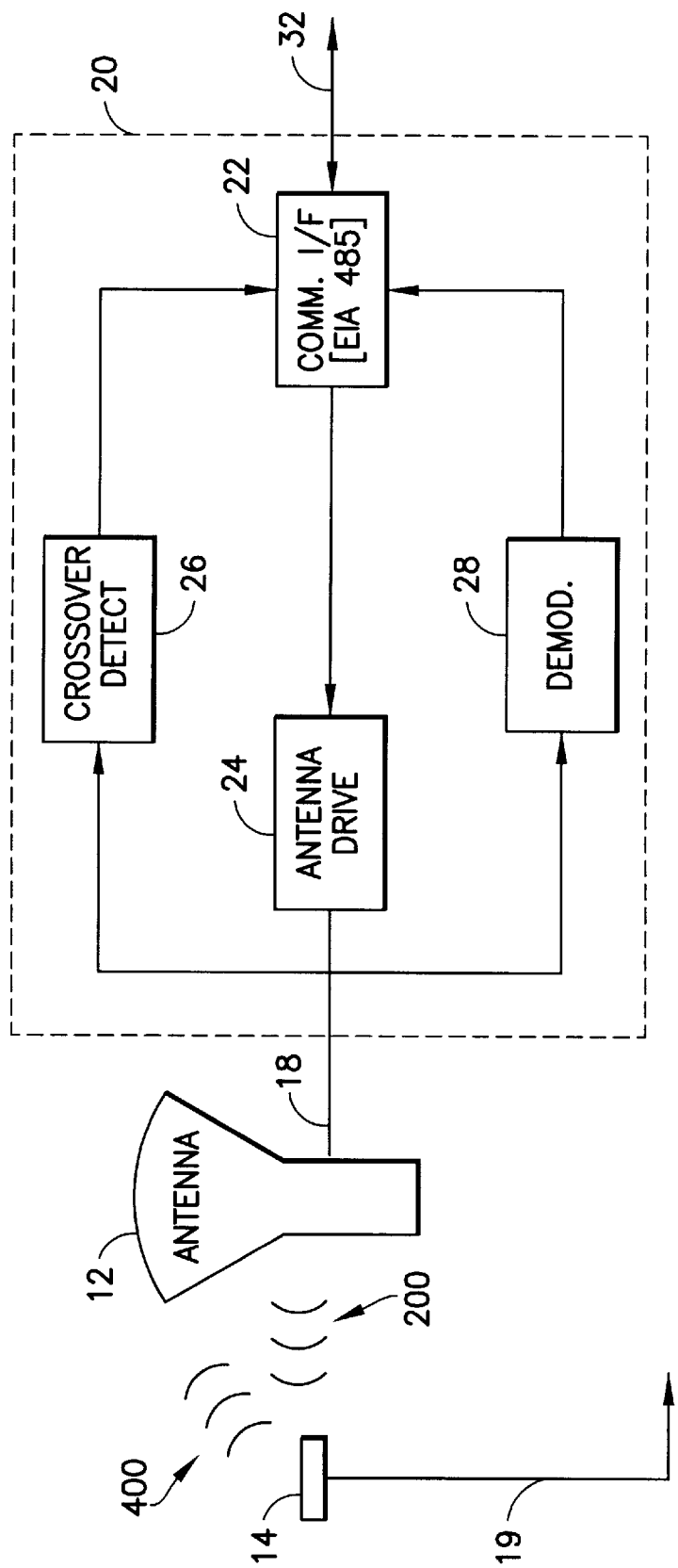
FIG. 2 is a schematic diagram of the antenna interface unit component of the present invention.

With reference now to FIGS. 1 and 2, there is depict schematic diagram of an antenna interface unit 20. Antenna interface unit 20 is a bi-directional subsystem which provides power at a predetermined antenna frequency to antenna 12 via an antenna drive unit 24 which is connected to antenna 12 through antenna cable 18. Antenna interface unit 20 communicates with control unit 40 via a communications interface unit 22 over control communication cable 32. Communication interface unit 22 is a bi-directional communications device conforming to EIA standard 485. Interface unit 22 manages the receipt of digital control signals from control unit 40 via communication control cable 32 and also manages the transmission of tag identification signals received by antenna 12 back to control unit 40.

An antenna excitation signal sent by control unit 40 at a predetermined frequency, presently preferred at 134.2 Kilohertz (kHz), is directed to antenna drive 24 by interface unit 22. Antenna drive unit 24 contains power transistors and MOSFET circuitry known in the art for powering antenna 12 which generates the electromagnetic excitation field within which PIT tags will pass. The particular circuitry of communication interface unit 22 and antenna drive 24 is of a type commonly known in the art and will not be discussed in detail herein, it being well within the abilities of the person of skill in the art to design such systems.

In a presently preferred embodiment, the communication control cable 32 is a shielded cable containing four twisted pairs of low capacitance 24 AWG stranded conductors, having aluminum shielding, a capacitance of 12.5 picofarads (pf) per foot, and a nominal impedance of 100 ohms. Of course, it will be recognized that the particular methodology for the transmission and reception of bi-directional signals between antenna interface unit 20 and control unit 40 is a matter of design choice, and can be implemented in any manner known in the art for exchanging analog and/or digital signals. It is, however, preferred that the communication interface and cable conform to the presently known EIA RS485 communication standard.

When the system is active, communication interface 22 receives a 134.2 kHz excitation signal from control unit 40 via communication cable 32. This excitation signal is in turn fed to antenna drive unit 24 which powers antenna 12 and causes antenna 12 to generate an electromagnetic field having a frequency at or near the excitation frequency of 134.2 kHz, depending on such factors as antenna geometry and tuning, which are easily modified as needed by the on of skill. With continued reference FIG. 2, when test tag 14 is enabled by control unit 40, test tag circuitry 104 is charged by the electromagnetic field 200 emitted by antenna 12 and utilizes this charge to emit a tag identification signal 400 which is detected by antenna 12. Antenna 12 then passes the detected tag identification signal 400 to antenna interface unit 20. Identification signal 400 is preferably an analog signal generated, in a manner known in the art, in accordance with the ISO type B tag identification convention. It will of course be recognized, however, that the identification signal emitted by any PIT tag detected by the system, including remote test tag 14, may be generated in any manner known in the art of passive integrated transponder signaling as a matter of design choice.

In the preferred ISO type B embodiment, identification signal 400 is generated by modulating the excitation energy field 200. Specifically, for a type B identification tag, the ISO requirement is to set the excitation field at a fixed frequency of 134.2 kHz. As soon as the type B tag receives enough energy, it returns its identification signal at a rate of 4,194 bits per second by modulating the amplitude of the excitation field at a rate of 1 bit per 32 cycles of the excitation field. A bit 0 is represented when the amplitude variation is done in the middle of a 32 cycle bit cell. A bit 1 is represented when no transition occurs in the middle of the bit cell. It will be recognized by the person of skill in the art following the ISO type B requirement that there must be a variation of amplitude at each 32 cycle bit cell in order for the receiver to stay synchronized with the tag identification frame. Variations of the frequencies, cell size and bit transitions will of course be well within the abilities of the person of skill in the art, and may be modified as a matter of design choice and still considered within the scope of the present invention.

Referring once again to FIG. 2, a demodulator 28 receives the modulated tag identification signal 400 from antenna 12 and demodulates it, thereby converting it into a. signal useable by control unit 40. Demodulator 28 contains a digitizer (not shown) of a type known in the art which digitizes the tag identification signal and passes it to communication interface 22 for further transmission to control unit 40.

Figure 5:
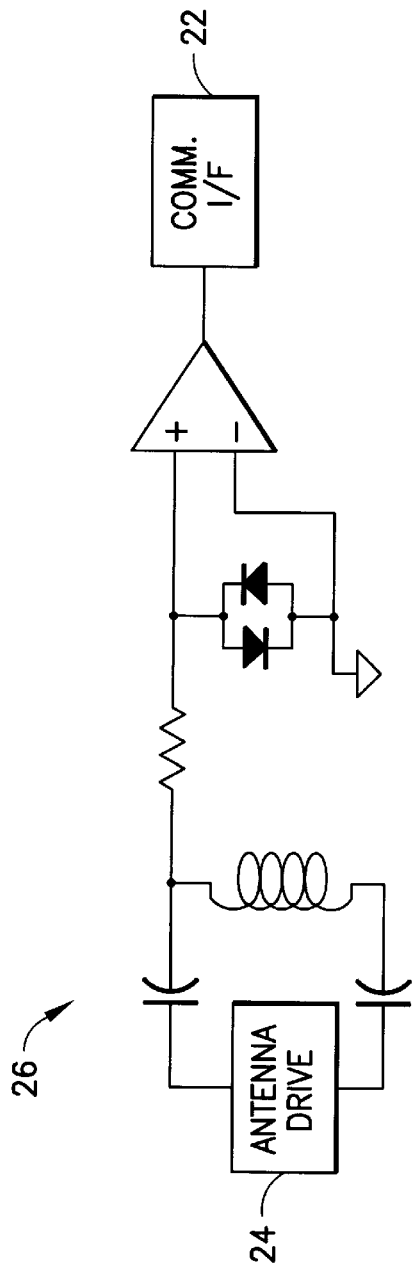
FIG. 5 is a schematic circuit diagram of a preferred cross-over detector circuit deployed in the system of the present invention.

Antenna interface unit 20 further contains a crossover detection circuit 26 that is controllable by control unit 40. When activated, the crossover detector 26 permits the detection of the voltage signal present on antenna 12 when antenna 12 is driven by antenna drive unit 24. To achieve this, control unit 40 activates a switch (not shown) which causes the output of crossover detector 26 to be sent through communication interface 22 to control unit 40 rather than the output of demodulator 28. The switch function may be implemented in firmware in communication interface 22, or via relay arrangement, or other commonly known technique, as a matter of design choice. Therefore, while the antenna is being driven, it is possible to know if a field is actually being produced by the antenna. This feature allows a system operator to detect an open antenna coil or a failure in the antenna drive system. A presently preferred crossover detection circuit schematic is depicted in FIG. 5, and exemplary output waveforms are depicted in FIG. 6.

Figure 6:
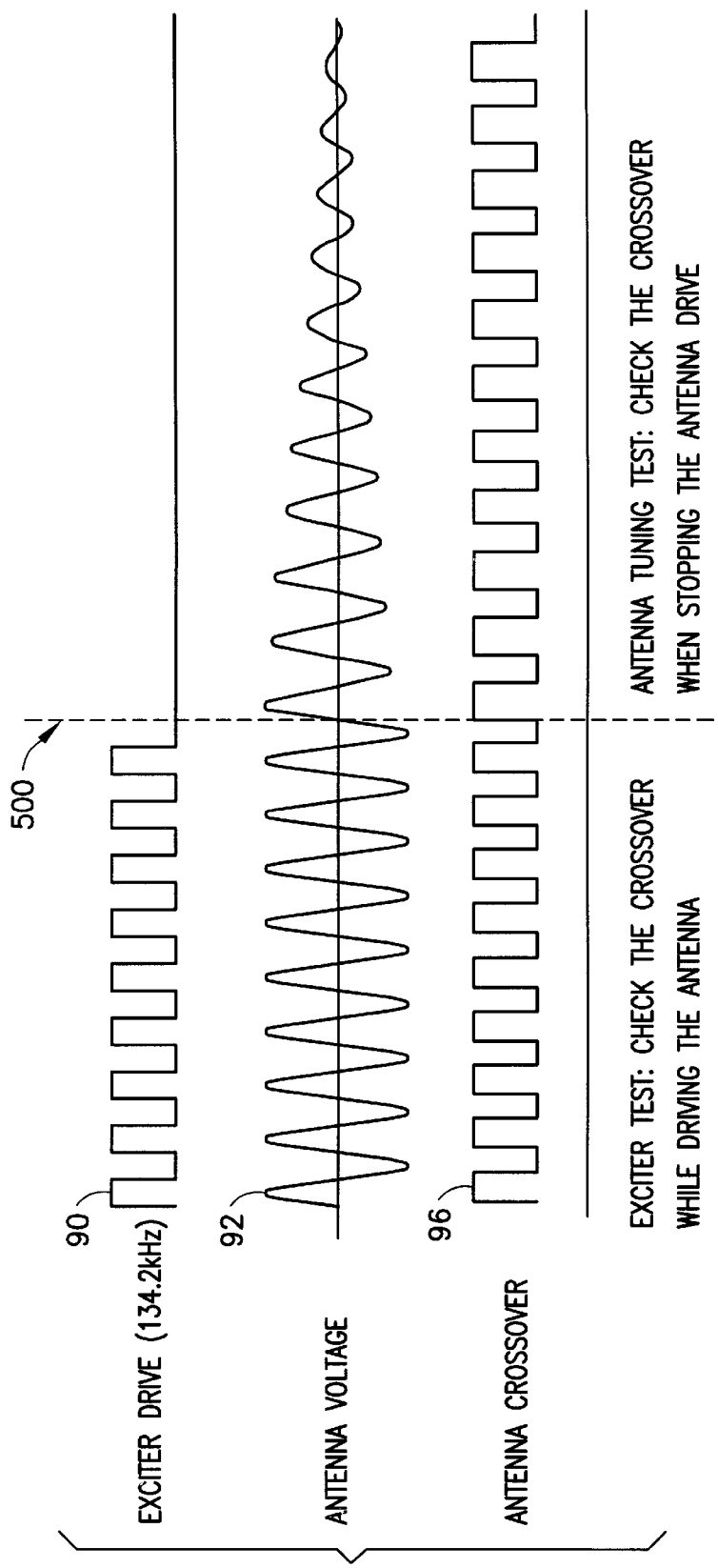
FIG. 6 is an illustration of exemplary signal waveforms obtained during certain diagnostic tests conducted within the system of the present invention.

Referring now to FIG. 6, there are depicted three exemplary waveforms representing, from top to bottom, an excitation drive signal 90 at 134.2 kHz, the corresponding antenna voltage signal 92 generated by said antenna when driven at that frequency, and an antenna crossover signal 96 emitted by said crossover detector 26 when detecting the antenna voltage signal. The set of signals to the left of, dashed line 500 shows that crossover detector circuit 26 will output a square wave 96 having leading and trailing edges corresponding to the zero crossing points of the sinusoidal antenna voltage signal 92 present on antenna 12 as it is being driven by antenna drive circuit 24 in response to an applied square wave drive signal 90 at the preferred system design frequency of 134.2 kHz. Of course it will be recognized by the person of skill that detection of the antenna voltage may be implemented in a number of ways, as long as the detector emits a signal corresponding to the signal present on antenna 12 during operation from which amplitude and frequency may be derived.

Figure 3:
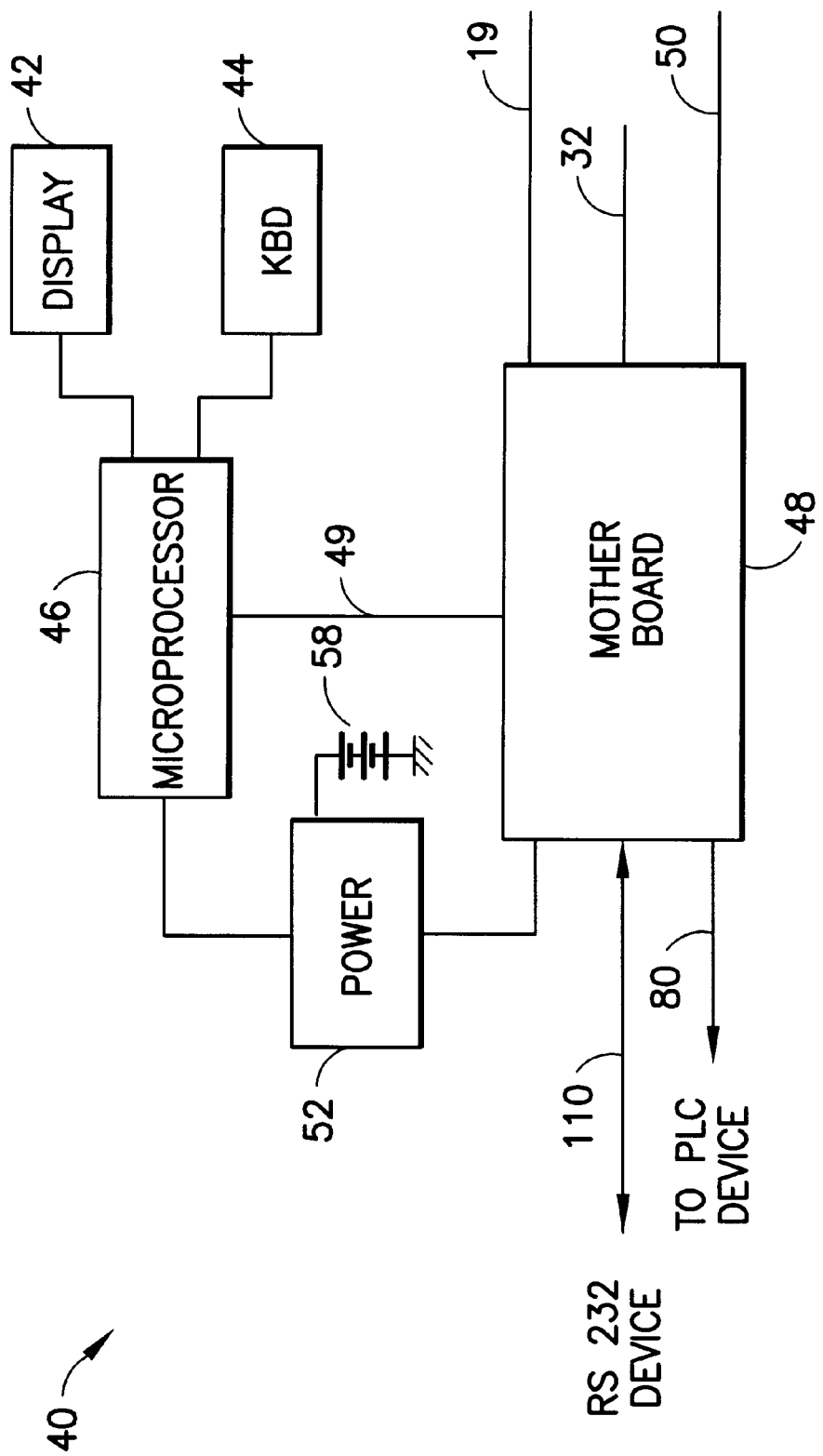
FIG. 3 is a schematic representation of the control unit component of the present invention.

With reference now to FIGS. 1 and 3, FIG. 3 shows a schematic representation of the control unit 40. Control unit 40 comprises a microprocessor 46 which is preferably a programmable microprocessor containing, in a manner known in the art, a CPU, memory and a programmable logic unit (not shown). Microprocessor 46 may be controlled via keyboard 44 and may output information via visual display 42 which may be, for example, a backlit liquid crystal display (LCD) or other commonly known visual display device such as, for example, a standard LCD screen or CRT. Microprocessor 46 is also capable of driving visual and audible indicators (not shown) in a manner known in the art.

Microprocessor 46 is connected to a mother board 48 via a microprocessor controller cable array 49. Cable 49 may comprise a series of EIA RS 232 serial cables, as well as direct wiring connections between the microprocessor 46 and other system components. Mother board 48 and microprocessor 46 are powered by power unit 52 which converts standard 120 volt AC power to the various voltage requirements of the various system components in a manner known in the art. A battery backup unit 58 may also be optionally included.

Mother board 48 provides a point for termination and distribution of the various communication cables used throughout the system. Thus, as mentioned above, the twisted pair connection between control unit 40 and antenna interface 20, the control wire leads 19 of remote test tag 14, and the data communication cable 50 connecting the control unit to computer 60 all route through mother board 40. As mentioned above, the particular wiring and communication schemes mentioned herein are merely representative of the presently preferred embodiments, it being recognized by the person of skill in the art that the particular data communication methods and control wiring schemes may be adopted in any manner known in the art, provided that the herein described signals necessary to operate the system 10 are present. Thus, for example, data communication cables 50 may be RS 232 type DB25 cables, EIA 485 metallic cables, fiber optic cables, or any combination thereof. Alternatively, a wireless communication methodology, utilizing digital or analog radio signals, infrared signals, etc. may also be deployed, as a matter of design choice.

With continued reference to FIGS. 1 and 3, control unit 40 is connected to a general purpose digital computer 60 and communicates therewith for the purpose of receiving control information therefrom and for passing information such as received PIT tag ID's and diagnostic signals from control unit 40. If desired, control unit 40 may communicate via additional communication line 110 to, for example, an RS 232 device for communication with a remote maintenance computer of other control mechanism (not shown). The system 10 through control unit 40 may also optionally control programmable logic control (PLC) devices through PLC lead 80 under the control of microprocessor 46 through mother board 48. The modular nature of the system also permits, if desired, a redundant configuration so that two sets of antenna interface units 20, control units 40, antennas 12, and remote tags 14 may be deployed for a single passage 16, controlled by one or more computers 60.

Referring once again to FIGS. 2, 5 and 6, an additional diagnostic capability of the system is depicted and herein described. Specifically, it is possible to remotely test the tuning of antenna 12 utilizing crossover detector 26 under the control of control unit 40 and optionally under the remote control of computer 60. Referring to FIG. 6, there is depicted to the right of dash line 500 the respective excitation drive signal 90 analog antenna voltage signal 92 and antenna crossover signal 94 described above. These result when the antenna drive unit 24 and crossover detector 26 are operated by control unit 40 through communication interface 22 in the following manner. The excitation drive signal to antenna drive 24 is turned off by control unit 40, thus the excitation drive signal 90 to the right of dash line 500 drops to zero. During normal operation, when driven by an excitation signal, the antenna is forced to oscillate at the excitation frequency, which in the preferred embodiment is 134.2 kHz as per ISO requirements. However, when the excitation drive signal is turned off, the electromagnetic field present at antenna 12 collapses and the antenna voltage 92 will decay at the natural, self resonant frequency of the antenna, which may be derived using the well-known frequency equation:

$$f = \frac{1}{2\pi\sqrt{LC}}$$

As is known in the art, the natural frequency of an antenna is determined by the inductance of the antenna (L) and the total value of the tuning capacitors (C). When the antenna is properly tuned, the natural frequency of the antenna should be 134.2 kHz, the preferred driving frequency of the system. By analyzing the frequency of the decaying voltage waveform 92—or of the crossover signal 94—after the excitation drive signal has been turned off, a system operator can determine the natural frequency of the antenna Specifically, the frequency of the zero crossing (crossover) signal 94 output by the antenna crossover detector 26 while the antenna voltage is decaying corresponds to the resonant frequency of the antenna Thus, proper tuning of the antenna 12 may be determined remotely utilizing the above-described antenna tuning test. Such a test may be activated under direct operator control by interaction with keyboard 44 connected to control unit 40 or, alternatively, may be implemented under the control of computer 60, as a matter of design choice. Through the use of feedback techniques known in the art, it is possible to remotely tune the antenna using this frequency information.

Thus, it will be readily recognized that the system in accordance with the present invention offers significant advantages over prior art systems in its ability to perform various functions from control points not local to the antenna sub-systems, which are typically field located and difficult to reach. The above-described diagnostics may be preprogrammed into computer 60 and/or control unit 40 for regular and systematic testing of the entire system without specific user intervention. Further, reprogramming, maintenance and functional changes may also be made from local or remote computer locations. Thus, changing operating parameters and performing preliminary troubleshooting from a central point is an inherent feature of the inventive system. Overall maintenance costs can be greatly reduced, since it will only be necessary to dispatch maintenance personnel to remote locations after verification that the equipment has actually malfunctioned, through the diagnostic tests described above.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A system for remotely testing a passive integrated transponder (PIT) tag interrogation system comprising:
    at least one antenna element for emitting a field of excitation energy at an energy level sufficient to energize a PIT tag coming within said field and for detecting an identification signal emitted by a PIT tag in response to said energization;
    at least one remote test PIT tag fixedly positioned proximate said antenna element within said field; and
    a control unit for selectively enabling said remote test PIT tag to receive said excitation energy from said antenna element and emit a remote test PIT tag identification signal responsive thereto, so as to permit the selective testing of said PIT tag interrogation system by confirming receipt of said remote test PIT tag identification signal in response to said selective enabling of said remote test PIT tag.

2. The system of claim 1, further comprising an antenna interface device for receiving said detected PIT tag identification signal from said antenna element, said interface device comprising an antenna drive circuit for driving said antenna element at a predetermined frequency and at a predetermined voltage; a demodulator circuit for demodulating said detected PIT tag identification signals and for generating a demodulated PIT tag identification signal; and a communication interface subsystem connected to said demodulator circuit and to said antenna drive circuit, said communication interface subsystem transmitting said demodulated PIT tag identification signals to said control unit and receiving control signals therefrom.

3. The system of claim 2, wherein said antenna interface unit further comprises an antenna signal detection circuit for detecting said antenna voltage and for outputting an antenna test signal representative of said antenna voltage to said control unit so as to permit confirmation that said antenna element is operating.

4. The system of claim 3, wherein said control unit comprises a user programmable microprocessor.

5. The system of claim 4, wherein said control unit is further connected to a general purpose digital computer operable for controlling said control unit and for processing data received from said control unit.

6. The system of claim 5, further comprising a passage within which said field of excitation energy is focused and through which items carrying PIT tags to be detected are directed for detection by said antenna element.

7. The system of claim 6, wherein said passage is a fish tunnel and wherein said items carrying PIT tags are fish.

8. The system of claim 7 wherein said remote test PIT tag is mounted outside said fish tunnel.

9. The system of claim 4, wherein said remote test PIT tag comprises a relay controllable by said control unit for selectively activating PIT tag circuitry within said remote test PIT tag so as to permit said selective enabling of said remote test PIT tag.

10. The system of claim 5, wherein said control unit further comprises an excitation signal generating circuit for generating an excitation signal operable for causing said antenna drive circuit to drive said antenna at said predetermined frequency.

11. The system of claim 10 further comprising a first switch element for selectively activating said excitation signal generating circuit and wherein said antenna interface unit further comprises a second switch element controllable by said control unit for selectively switching between said demodulated PIT tag identification signal and said antenna test signal as an output of said antenna interface unit.

12. The system of claim 11, wherein said demodulator circuit further comprises a digitizing circuit for converting said demodulated PIT tag identification signal to a digital PIT tag identification signal.

13. The system of claim 12, further comprising a passage within which said field of excitation energy is focused and through which items carrying PIT tags to be detected are directed for detection by said antenna element.

14. The system of claim 13, wherein said passage is a fish tunnel and wherein said items carrying PIT tags are fish.

15. The system of claim 14 wherein said remote test PIT tag is mounted outside said fish tunnel.

16. The system of claim 1, wherein the remote test PIT tag is fixedly located at a fringe of said energy field, such that successful energization of said remote test PIT tag and successful detection of said remote PIT tag identification signal is indicative of said sufficient energy level of said excitation field.

* * * * *